United States Patent
Frankel et al.

(10) Patent No.: US 9,659,066 B2
(45) Date of Patent: *May 23, 2017

(54) DYNAMIC INTEREST-BASED NOTIFICATIONS

(71) Applicant: International Business Machines Corporation, Armonk, NY (US)

(72) Inventors: Lisa M. Frankel, Littleton, MA (US); Peter H. Klenk, North Chelmsford, MA (US); Paul Komar, Lexington, MA (US); Yuhong Yin, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,344

(22) Filed: Sep. 25, 2014

(65) Prior Publication Data

US 2015/0213024 A1    Jul. 30, 2015

Related U.S. Application Data

(63) Continuation of application No. 14/163,411, filed on Jan. 24, 2014.

(51) Int. Cl.
*G06F 17/30* (2006.01)
*H04L 12/58* (2006.01)
*H04L 12/18* (2006.01)

(52) U.S. Cl.
CPC .... *G06F 17/3053* (2013.01); *G06F 17/30386* (2013.01); *H04L 12/1859* (2013.01); *H04L 12/1895* (2013.01); *H04L 51/04* (2013.01)

(58) Field of Classification Search
CPC .......... G06F 17/30386; G06F 17/3053; G06F 17/30867; G06F 17/30861; G06F 9/542; G06F 11/3072; G06F 2201/86; H04L 51/04; H04L 67/306; H04L 12/587; H04L 67/26; G06Q 50/01

See application file for complete search history.

(56) References Cited

U.S. PATENT DOCUMENTS

| | | | |
|---|---|---|---|
| 6,393,460 B1 | 5/2002 | Gruen et al. | |
| 7,250,955 B1 * | 7/2007 | Beeman | G06F 9/4443 345/592 |
| 8,443,041 B1 | 5/2013 | Krantz et al. | |
| 8,577,983 B2 * | 11/2013 | deCarmo | H04L 51/04 709/206 |

(Continued)

OTHER PUBLICATIONS

U.S. Appl. No. 14/163,411 Non-Final Office Action, Oct. 14, 2015, 18 pg.

*Primary Examiner* — James E Richardson
(74) *Attorney, Agent, or Firm* — Cuenot, Forsythe & Kim, LLC (57) ABSTRACT

Providing dynamic, interest-based change notifications includes detecting an event for an artifact managed by a collaborative system, determining a user subscribed to the artifact, and, responsive to the event, calculating a score for the event using a processor. The score is user-specific and indicates a level of interest of the user for the event. The score is compared with a threshold score. A change notification of the event is sent to the user responsive to determining that the score exceeds the threshold score.

11 Claims, 4 Drawing Sheets

(56) References Cited

U.S. PATENT DOCUMENTS

| | | | |
|---|---|---|---|
| 2002/0198946 A1* | 12/2002 | Wang | H04L 12/581 709/206 |
| 2003/0097485 A1* | 5/2003 | Horvitz | G06F 21/335 719/313 |
| 2003/0120593 A1* | 6/2003 | Bansal | G06F 17/30873 705/39 |
| 2003/0131142 A1* | 7/2003 | Horvitz | G06F 21/335 719/313 |
| 2004/0002972 A1* | 1/2004 | Pather | G06F 9/542 |
| 2004/0010808 A1* | 1/2004 | deCarmo | H04L 51/04 725/139 |
| 2005/0240603 A1* | 10/2005 | Bodin | G06F 17/30041 |
| 2006/0026000 A1* | 2/2006 | Bodin | G06Q 10/10 704/270.1 |
| 2006/0085379 A1* | 4/2006 | Heidloff | G06Q 10/10 |
| 2007/0005394 A1* | 1/2007 | Bleyendaal | G06F 19/324 705/2 |
| 2007/0124430 A1* | 5/2007 | Wright | H04L 12/2602 709/219 |
| 2007/0220016 A1* | 9/2007 | Estrada | G06F 17/30867 |
| 2007/0282962 A1* | 12/2007 | Kim | G06Q 10/107 709/207 |
| 2008/0178196 A1 | 7/2008 | Heidloff et al. | |
| 2008/0225870 A1* | 9/2008 | Sundstrom | G06Q 10/10 370/401 |
| 2013/0007069 A1* | 1/2013 | Chaliparambil | G06Q 50/22 707/803 |
| 2013/0066865 A1 | 3/2013 | Chan et al. | |
| 2013/0346922 A1* | 12/2013 | Shiplacoff | G06F 3/04842 715/835 |
| 2014/0129661 A1* | 5/2014 | Thyagaraja | G06F 9/542 709/207 |
| 2014/0282003 A1* | 9/2014 | Gruber | G06F 3/16 715/727 |
| 2015/0213082 A1 | 7/2015 | Frankel et al. | |

\* cited by examiner

| Rule No. | Factor(s) Addressed | Rule |
|---|---|---|
| 1 | Artifact type | Defect: initial score of 100<br>Enhancement: initial score of 50 |
| 2 | Severity | Blocking: +30<br>High: +10 |
| 3 | Subscription type | Self-subscribed: +20<br>Mentioned: +20<br>Subscribed by another: +10 |
| 4 | User's relationship to artifact | Creator: +30<br>Owner of request: +30<br>Component lead: +20<br>Team member: +10 |
| 5 | User's interaction with artifact | Modified/updated in last 2 days: +30<br>Unmodified in past week: -30 |

| Score | Priority for sending email |
|---|---|
| 0 - 80 | Low |
| 81 - 159 | Medium |
| >= 160 | High |

FIG. 5

| Subject | Importance | Date |
|---|---|---|
| Defect 1: application crashed | High | 10/15/2013 12:35 PM |
| Enhancement 1: should add a button to the second page | Low | 10/15/2013 12:38 PM |

FIG. 6-1

| Subject | Importance | Date |
|---|---|---|
| Defect 1: application crashed | Medium | 10/15/2013 12:35 PM |
| Enhancement 1: should add a button to the second page | Low | 10/15/2013 12:38 PM |

FIG. 6-2

| Subject | Importance | Date |
|---|---|---|
| Defect 1: application crashed | High | 10/15/2013 12:35 PM |
| Enhancement 1: should add a button to the second page | Medium | 10/15/2013 12:38 PM |

FIG. 6-3

DYNAMIC INTEREST-BASED NOTIFICATIONS

CROSS-REFERENCE TO RELATED APPLICATIONS

This application is a Continuation of U.S. application Ser. No. 14/163,411, filed on Jan. 24, 2014, the entirety of which is incorporated herein by reference.

BACKGROUND

A change notification system is often included as a part of a collaborative system. A change notification system, in general, is a mechanism or subsystem that is responsible for sending notifications to users responsive to a change relating to an artifact that is stored, managed, or otherwise monitored by the collaborative system. The notification that is sent is a message that advises a user of the change relating to the artifact. Examples of messages that can be used or sent as a notification include, but are not limited to, an electronic mail, a text and/or instant message, a feed, a telephone call, or the like.

In a conventional collaborative system, the change notification system embraces an "all or nothing" approach to notifications. For a given change to an artifact, notification(s) are sent to each user that is subscribed to the artifact. If one is not subscribed to the artifact, that individual does not receive a notification of the change. Thus, the determination of whether to send a notification is a binary decision predicated upon whether a change to the artifact has occurred. In the usual case, the "all or nothing" approach to notifications leads to users receiving a large number of notifications and what is often referred to as "information overload." The number of notifications received by a user tends to be so large that critical notifications become lost among many non-critical notifications also received by the user.

SUMMARY

A method includes detecting an event for an artifact managed by a collaborative system, determining a user subscribed to the artifact, and responsive to the event, calculating a score for the event using a processor. The score is user-specific and indicates a level of interest of the user for the event. The method further includes comparing the score with a threshold score and sending a change notification of the event to the user responsive to determining that the score exceeds the threshold score.

A system includes a processor programmed to initiate executable operations. The executable operations include detecting an event for an artifact managed by a collaborative system, determining a user subscribed to the artifact, and responsive to the event, calculating a score for the event. The score is user-specific and indicates a level of interest of the user for the event. The executable operations further include comparing the score with a threshold score and sending a change notification of the event to the user responsive to determining that the score exceeds the threshold score.

A computer program product includes a computer readable storage medium having program code stored thereon. The program code is executable by a processor to perform a method. The method includes detecting, using the processor, an event for an artifact managed by a collaborative system, determining a user subscribed to the artifact using the processor, and responsive to the event, calculating a score for the event using the processor. The score is user-specific and indicates a level of interest of the user for the event. The method further includes comparing the score with a threshold score using the processor and sending a change notification of the event to the user responsive to determining that the score exceeds the threshold score using the processor.

BRIEF DESCRIPTION OF THE SEVERAL VIEWS OF THE DRAWINGS

FIGS. 6-1, 6-2, and 6-3 illustrate exemplary user interfaces displayed by clients of different users.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to collaborative systems, and, more particularly, to providing change notifications for a collaborative system. In accordance with the inventive arrangements disclosed herein, change notifications are provided to one or more users of a collaborative system using a dynamic and interest-based approach. A user is subscribed to one or more artifacts managed by the collaborative system. Changes to artifacts are detected as events that occur for, or to, the managed artifacts. Responsive to a detected event for a selected artifact, a score is calculated for the user and/or for each user that is subscribed to the selected artifact. The score calculated for a user specifies the level of interest of the user in the particular change that is detected for the selected artifact and/or for the selected artifact itself. The score, and accordingly, the level of interest, that is calculated for each user is user-specific, but may or may not be unique to each user.

The collaborative system uses the calculated score to determine any of a variety of different automatic actions relating to change notifications. In one aspect, the score is used to determine whether a user receives a change notification regarding the detected change at all. In another aspect, at least for those users that are to receive a change notification, the score may be used to select the particular communication channel over which the change notification is delivered. The particular communication channel dictates the type of the message that is delivered as the change notification. Other aspects of a change notification such as the priority level applied to the message sent as the change notification can be determined from the score calculated responsive to a change to an artifact.

Several definitions that apply throughout this document are provided below. As defined herein, the phrase "collaborative system" means a system formed of one or more interconnected data processing systems and appropriate software that, when executed, allows users engaged in a common task to work cooperatively to achieve one or more goals. A collaborative system manages artifacts, e.g., digital artifacts.

Examples of collaborative systems include, but are not limited to, meeting management systems, instant messaging systems, Web conferencing systems, social media Websites such as blogging sites, micro-blogging sites, etc. Additional examples of collaborative systems include, but are not limited to, software configuration management systems, change request systems, or the like.

As used herein, the term "artifact" means a digital asset that is managed by a collaborative system. As used herein, the term "manage," as applied to a collaborative system managing an artifact, means storing, controlling, tracking, and/or monitoring, an artifact. In a blogging and/or micro-blogging site, an artifact may be a user's feed through which that user makes posts available. In a change request system, an artifact is a change request. In a software management system, an artifact is a portion of program code, e.g., source code.

As used herein, the term "notification" means a communication implemented as any one of a variety of different messages that is provided to one or more users over a selected communication channel. As used herein, the phrase "change notification" means a notification advising a user, e.g., a recipient, that a change has occurred to a particular artifact managed by a collaborative system and to which the user is subscribed. Examples of notifications and change notifications include any of a variety of different types of messages such as electronic mail messages, instant and/or text messages, telephone calls and/or telephone messages, feeds, or the like.

As defined herein, the term "computer readable storage medium" means a storage medium that contains or stores program code for use by or in connection with an instruction execution system, apparatus, or device. As defined herein, a "computer readable storage medium" is not a transitory propagating signal per se.

As defined herein, the term "processor" means at least one hardware circuit, e.g., an integrated circuit, configured to carry out instructions contained in program code. Examples of a processor include, but are not limited to, a central processing unit (CPU), an array processor, a vector processor, a field-programmable gate array (FPGA), and a controller. As defined herein, the term "automatically" means without user intervention. As defined herein, the term "user" means a person, i.e., a human being.

Figure 1:
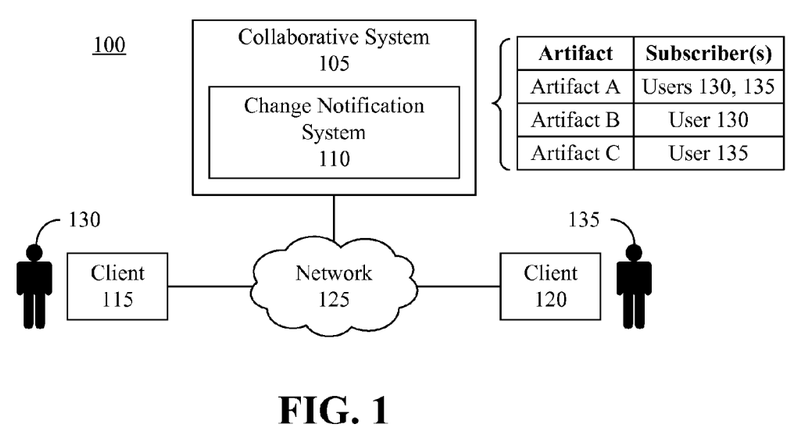
FIG. 1 is a block diagram illustrating an example of a network communication system.

FIG. 1 is a block diagram illustrating an example of a network communication system 100. Network communication system 100 includes a collaborative system 105 including a change notification system 110, a client 115, a client 120, and a network 125. Collaborative system 105 is communicatively linked to client 115 and client 120 through network 125. Client 115 is operated by, or otherwise associated with, a user 130. Client 120 is operated by, or otherwise associated with, a user 135.

Collaborative system 105 is implemented as one or more interconnected data processing systems. In one example, collaborative system 105 is implemented as one or more interconnected servers. Each of clients 115 and 120 also is implemented as a data processing system. Exemplary implementations for client 115 and/or client 120 include, but are not limited to, personal computer systems such as laptop computer systems, desktop computer systems, tablet computer systems, handheld computer systems, mobile communication devices, or the like. In some cases, a client may be implemented as a Voice-Over Internet Protocol (VoIP) telephone or a conventional telephone, for example, in cases where the change notification is a telephone call, whether pre-recorded, automated, or the like.

Network 125 is the medium used to provide communications links between various devices and data processing systems connected together within network communication system 100. Network 125 may include connections, such as wire, wireless communication links, or fiber optic cables. Network 125 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

In operation, collaborative system 105 manages a plurality of artifacts and detects changes to the artifacts by detecting the occurrence of events for the artifacts. Consider an example in which collaborative system 105 is a change request system that manages change requests as artifacts. For purposes of illustration and not limitation, collaborative system 105 manages artifacts A, B, and C. As shown, users 130 and 135 both are subscribed to artifact A. Only user 130 is subscribed to artifact B. Only user 135 is subscribed to artifact C.

When an artifact is created within collaborative system 105, the artifact may undergo any of a variety of different changes through its lifecycle which spans creation through closing or marking complete. Changes to the artifact may include editing of the artifact, receiving comments from users that are associated with the artifact, updates to the status of the artifact, subscribing a user to the artifact, terminating a user subscription to the artifact, associating the artifact with a character string (e.g., "tagging" the artifact), or the like. Each change to the artifact is detected as an event. Thus, exemplary events for a given artifact managed by collaborative system 105 include, but are not limited to, an edit event, a comment event, a subscription event indicating that a new user has been subscribed to the artifact, an un-subscribe event indicating that a subscription for a user has been terminated or discontinued, the closing or completion of an artifact, the tagging of an artifact (e.g., tagging a photo with a name or tagging a feed or message stream with a topic and/or keyword), etc.

Responsive to each change, or event, that is detected for an artifact, change notification system 110 calculates one or more scores. Each score is associated with an event, and thus, is associated with the artifact to which the event, or change, belongs. In one aspect, a score is calculated for each user that is subscribed to the artifact to which the event belongs. As an example, responsive to detecting an event for artifact A, change notification system 110 calculates a score for the event for user 130 and another score for the event for user 135.

In one aspect, change notification system 110 determines whether to notify each respective one of users 130 and 135 of a change to the artifact by comparing the score for each respective user to a threshold score. Responsive to determining that the score of a user exceeds the threshold score, change notification system 110 sends a change notification to that user. Thus, responsive to the change to artifact A, change notification system 110 calculates a score for user 130 and a score for user 135. The score for each user is an estimate of the level of interest the user has in the detected event for the artifact and/or in the artifact itself. The higher the score, the higher the level of interest in the event and/or artifact that is estimated by change notification system 110 for the user.

Responsive to determining that the score for user 130 exceeds the threshold score, change notification system 110 sends a change notification of the detected event to user 130. Similarly, responsive to determining that the score for user 135 exceeds the threshold score, change notification system 110 sends a change notification of the detected event to user 135. It should be appreciated that the score for user 130 may be different than the score for user 135. As such, the realm of potential outcomes includes both user 130 and user 135 receiving a change notification, neither user 130 nor user 135 receiving a change notification, user 130 receiving a change notification while user 135 does not receive a change notification, and user 135 receiving a change notification while user 130 does not receive a change notification.

In another aspect, change notification system 110 determines one or more additional actions or types of actions to be taken. For example, presuming that a change notification is sent to a user, change notification system 110 can determine the communication channel over which the change notification is sent and/or a priority that may be associated with the change notification. These and other aspects will be described in greater detail with reference to the remaining figures.

Figure 2:
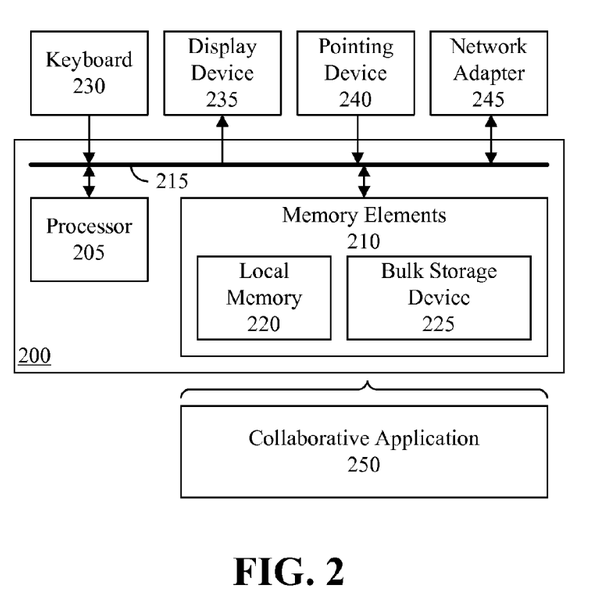
FIG. 2 is a block diagram illustrating an exemplary architecture for a data processing system.

FIG. 2 is a block diagram illustrating an exemplary architecture 200 for a data processing system. Architecture 200 includes at least one processor 205, e.g., a central processing unit, coupled to memory elements 210 through a system bus 215 or other suitable circuitry. As such, architecture 200 can store program code within memory elements 210. Processor 205 executes the program code accessed from memory elements 210 via system bus 215 or the other suitable circuitry.

In one aspect, architecture 200 can be used to implement a data processing system or other programmable data processing apparatus that is suitable for storing and/or executing program code. Architecture 200 can be used to implement any data processing system including a processor and memory that is capable of performing and/or initiating the functions and/or operations described within this disclosure. Further, architecture 200 can be used to implement a data processing system having any of a variety of form factors including, but not limited to, those previously discussed with reference to FIG. 1, whether a client or a server.

Memory elements 210 include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Architecture 200 also can include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 optionally can be coupled to architecture 200. The I/O devices can be coupled to architecture 200 either directly or through intervening I/O controllers. One or more network adapters 245 also can be coupled to architecture 200 to enable architecture 200 to become coupled to other systems, computer systems, remote printers, and/or remote storage devices through intervening private or public networks. Modems, cable modems, wireless transceivers, and Ethernet cards are examples of different types of network adapters 245 that can be used with architecture 200.

As pictured in FIG. 2, memory elements 210 can store a collaborative application (application) 250. Application 250, being implemented in the form of executable program code, is executed by architecture 200 and, as such, is considered an integrated part of architecture 200. A data processing system implemented using architecture 200 and executing application 250 is configured to perform and/or initiate the various operations described within this disclosure. For example, a data processing system having architecture 200 and executing application 250 can implement operations of the collaborative system, operations of the change notification system, or both. It should be appreciated that application 250, including any parameters, rules, factors, and/or attributes utilized by application 250, are functional data structures that impart functionality when employed as part of a system using architecture 200.

Figure 3:
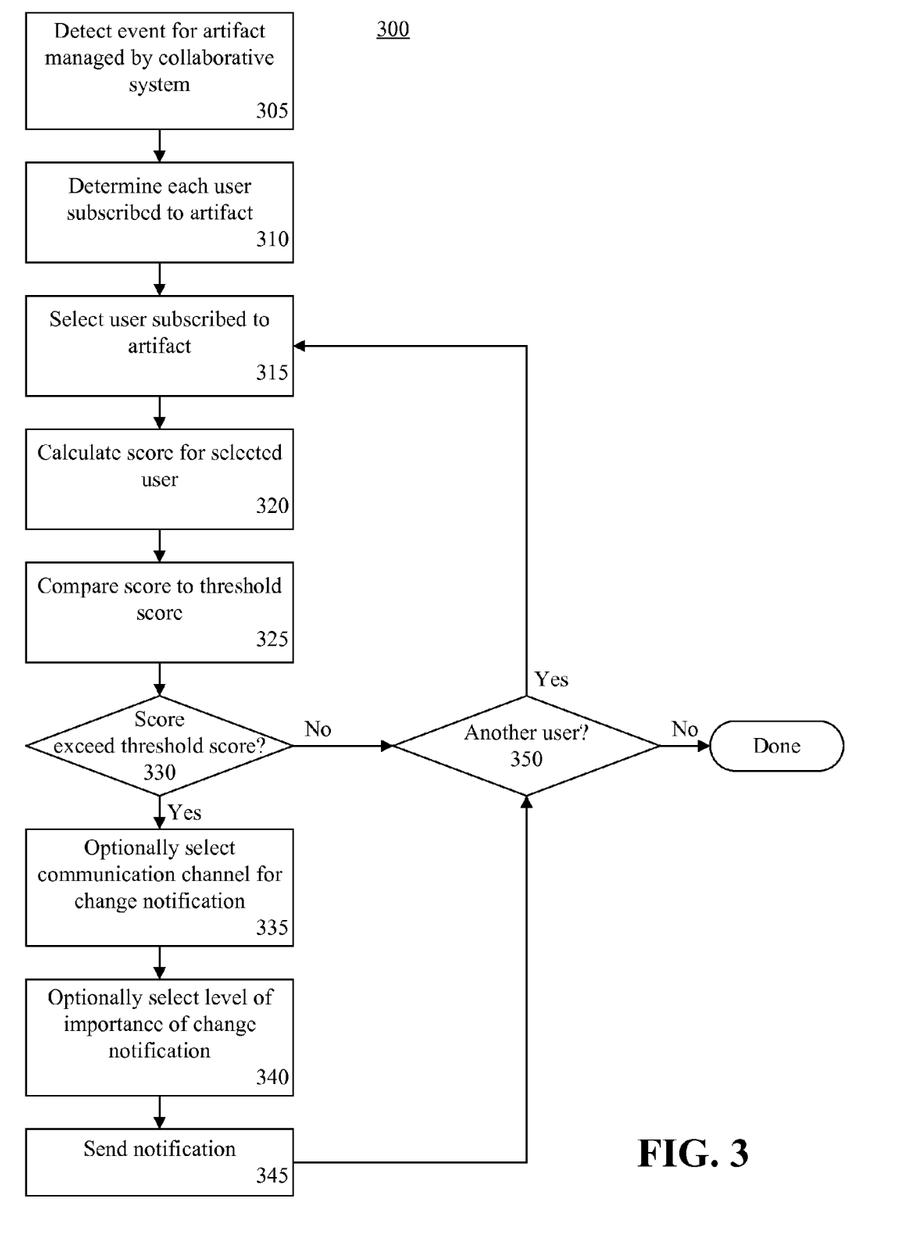
FIG. 3 is a flow chart illustrating an exemplary method of providing change notifications.

FIG. 3 is a flow chart illustrating an exemplary method 300 of providing change notifications. Method 300 is implemented by a system as described with reference to FIGS. 1 and 2. Method 300, for example, is implemented by a collaborative system having a change notification system or, in the alternative, a change notification system configured to interface and/or interact with a collaborative system.

In block 305, the system detects an event for an artifact that is managed by the collaborative system. As noted, an event includes the creation of an artifact, a modification of an artifact, the closing and/or deletion of an artifact, or the like. A modification of an artifact includes, but is not limited to, subscribing a user to the artifact, an edit to the artifact, posting of comments to the artifact, a change in status of the artifact, removal of a user subscription to the artifact, the scheduling of a meeting for an artifact, completion of a meeting for an artifact, associating an artifact with a text string (e.g., tagging), etc. For purposes of discussion and distinguishing one artifact from another, the artifact for which an event is detected is referred to as "the selected artifact" or "the instant artifact."

In block 310, the system determines each user that is subscribed to the instant artifact. As used herein, the phrase "subscribed to an artifact" means that a user is a candidate to receive change notifications for the artifact and/or any events occurring for the artifact as described within this disclosure. In block 315, the system selects a user subscribed to the instant artifact for processing.

In block 320, the system calculates a score for the selected user. The score is specific to the selected user, the instant artifact, and the detected event for the instant artifact. As such, the score that is calculated for the selected user and the instant artifact for the detected event may differ from the score calculated for another user subscribed to the instant, i.e., the same, artifact for the same event. Since the score further may be dependent upon the event, the score for the detected event for the selected user may differ from the score calculated for a different event for the instant artifact for the selected user.

In general, the score is calculated according to one or more rules that rely upon a variety of different factors. Each factor that is determined results in an adjustment to the score being calculated. An adjustment is implemented as an increase to the score or a decrease to the score. In some cases, an adjustment results in no change to the score depending upon the factor or factors involved. An exemplary list of factors used to calculate the score includes, but is not limited to, a determination as to whether the selected user subscribes to artifacts similar to the instant artifact, whether the selected user self-subscribed to the artifact or was subscribed to the artifact by a different user and/or the role and/or position of such different user, the relationship of the selected user to the instant artifact, any classification of the instant artifact, the level of participation of the selected user in artifacts similar to the instant artifact such as those artifacts having a same or similar classification as the instant artifact, the priority of the instant artifact, or the like. Further factors may include one or more additional inputs obtained from the collaborative system and/or one or more other collaborative systems.

For example, the size of the adjustment to the score calculated for the instant artifact responsive to the event may differ and/or be determined according to whether the selected user self-subscribed to the instant artifact. A user may subscribe one's self to an artifact, which is referred to as "self-subscribing." Alternatively, a different user may subscribe the selected user to the instant artifact. In that case, additional factors relating to the "different" user may be used to determine the size of the adjustment to the score. For example, the size of the adjustment may vary according to whether the selected user self-subscribed and, in cases where the selected user did not self-subscribe, the size of the adjustment further may vary according to the role, position, and/or relationship of the "different" user to the selected user, the artifact, and/or the detected event. For example, the size of the adjustment may be larger when the "different" user is a manager of the selected user as opposed to a tester or fellow team member. As such, factors relating to the "different" user that subscribes the selected user to the instant artifact may be used to determine the size of the adjustment or contribution to the score being calculated.

In another example, the size of the adjustment to the score calculated for the instant artifact responsive to the event may differ and/or be determined according to the relationship of the selected user to the instant artifact. The selected user may have a role such as creator, owner, team member (member of the team responsible for the instant artifact), a particular role as a team member such as developer, tester, product manager, technical writer, or the like. The relationship of the selected user to the instant artifact may be used to determine the size of the adjustment or contribution to the score being calculated.

In another example, the size of the adjustment to the score calculated for the instant artifact responsive to the event may differ and/or be determined according to the classification of the instant artifact. The instant artifact may be classified using any of a variety of different mechanisms and/or classification schemes. The instant artifact may be classified using one or more tags, one or more keywords, and/or assigned a team project area in which the instant artifact is created. The classification of the instant artifact may be used to determine the size of the adjustment or contribution to the score being calculated.

In still another example, the size of the adjustment to the score calculated for the instant artifact responsive to the event may differ and/or be determined according to the current level of participation of the selected user in other artifacts of the same or similar classification as the instant artifact. The selected user may have a level of participation in another artifact of the similar or same classification as the instant artifact which may be determined by the number of times the selected user accesses the similarly classified artifact and/or the frequency that the selected user accesses the similarly classified artifact during a defined period of time. The level of participation of the selected user for the similarly classified artifact may be used to determine the size of the adjustment or contribution to the score being calculated. For example, a higher level of interest in a similarly classified artifact as determined by higher frequency of access, etc., results in a larger increase to the score being calculated than a lower level of interest in the similarly classified artifact.

In yet another example, the size of the adjustment to the score calculated for the instant artifact responsive to the event may differ and/or be determined according to a priority level that is assigned to the instant artifact. Priority level of the instant artifact may be determined from one or more or any combination of factors such as an explicitly assigned priority, a determination or measure of urgency, importance, and/or severity of the artifact. In some cases, a priority and/or level of importance may be explicitly assigned to the instant artifact such as high, medium, or low. In other cases, priority may be determined as urgency, which may be determined according to a due date for the artifact. As an illustrative example, the system can determine the amount of time between the detected event and the due date for the artifact. The shorter the amount of time, the larger the adjustment, e.g., increase, to the score. In still other cases, the priority may be determined using any combination and/or sub-combination of the aforementioned factors.

As noted, in some cases one or more additional inputs from the collaborative system and/or one or more other collaborative systems may be obtained and used to calculate the score. As an example, consider the case in which one collaborative system is a meeting management system. The additional input used in calculating a score may be an indication that a meeting was held for the instant artifact. For example, the detected event may be the scheduling and/or the occurrence of the meeting. Responsive to a determination that the selected user attended the meeting, the score that is being calculated for the user and the artifact responsive to the detected event may be lowered. Since the selected user attended the meeting and is presumed to have knowledge of any matters discussed during the meeting, the selected user need not receive a change notification in the form of an electronic mail or other message describing the meeting. As such, the detected event, i.e., a meeting for the instant artifact in which the selected user was in attendance, is used to reduce the score that is being calculated. It should be appreciated that reduction of the score serves to reduce the estimated level of interest of the selected user in the event and/or artifact, but does not guarantee that the user will not receive a change notification.

In block 325, the system compares the score to a threshold score. The threshold score is used to determine whether the selected user is to receive a change notification of the detected event. In block 330, the system determines whether the score for the selected user exceeds the threshold score. If so, method 300 continues to block 335. If not, method 300 proceeds to block 350.

Continuing with block 335, the system has determined that the selected user will receive a change notification of the detected event. Accordingly, in block 335, the system optionally selects a communication channel over which the change notification to the user is to be sent. Examples of communication channels include, but are not limited to, text and/or instant messaging, telephony (whether conventional, VoIP, mobile, etc.), electronic mail, a feed, etc. Accordingly, the type of message that is sent as the change notification is determined by virtue of selecting the communication channel. A text and/or instant message is sent when text and/or instant messaging is selected. A telephone call, e.g., a pre-recorded and/or automated call, is placed when telephony is selected. An electronic mail message is sent when electronic mail is selected. A feed is updated when a feed is selected.

In one aspect, each of the available communication channels may be assigned to a score range. Responsive to the calculated score being within a particular score range, the communication channel associated with that score range is selected. For example, a score range of 100-120 is associated with electronic mail. A score range of 121-140 is associated with telephony. A score range of 141-160 is associated with text messaging. Accordingly, responsive to calculating the score to be 150, the system selects text messaging as the communication channel resulting in the change notification being sent as a text message. It should be appreciated that more than one communication channel may be associated with a same range resulting in multiple messages over different communication channels being sent and that ranges may or may not overlap one another.

In block 340, the system optionally selects a level of importance for the change notification. For example, in the case where the selected communication channel supports the assignment of importance to a message, the level of importance may be assigned or determined according to the score. Consider the case where the selected communication channel is electronic mail. Since electronic mail messages may be given an importance level of low, medium, or high, the system may set the importance level of the change notification according to the calculated score. As described with reference to communication channel selection, different score ranges can be associated with different levels of importance. Responsive to determining that the calculated score is within a particular score range, the system assigns the level of importance of the score range to the change notification. Accordingly, when the change notification is received by the client of the selected user, i.e., the recipient, the change notification is interpreted and displayed by the client with any visual identifiers used by the client to indicate the correct level of importance of the electronic mail.

The aforementioned discussion of communication channel selection and importance is provided for purposes of illustration only. It should be appreciated that in some cases, only the communication channel is selected while no evaluation of importance is performed. In other cases, an evaluation of importance may be performed regardless of whether any selection of the communication channel is performed. In still other cases, neither communication channel selection nor importance selection is performed. For example, the system may utilize a single communication channel for sending change notifications.

In block 345, the system sends the change notification to the user. The change notification is sent over the selected communication channel. Further, if appropriate, the change notification that is sent is assigned or designated with the selected level of importance.

Continuing with block 350, the system determines whether another user subscribed to the instant artifact remains to be processed. If so, method 300 loops back to block 315 to continue processing a next selected user. If not, method 300 is done. It should be appreciated that method 300 can be repeated and/or iterated by a system as needed to continue to monitor for further events for artifacts managed by the collaborative system.

FIG. 3 provides a general example of determining a level of interest of a user in a change to an artifact and/or to the artifact itself and selectively and dynamically providing the user with a change notification based upon the calculated level of interest. The following is a more specific, illustrative example.

Figure 4:
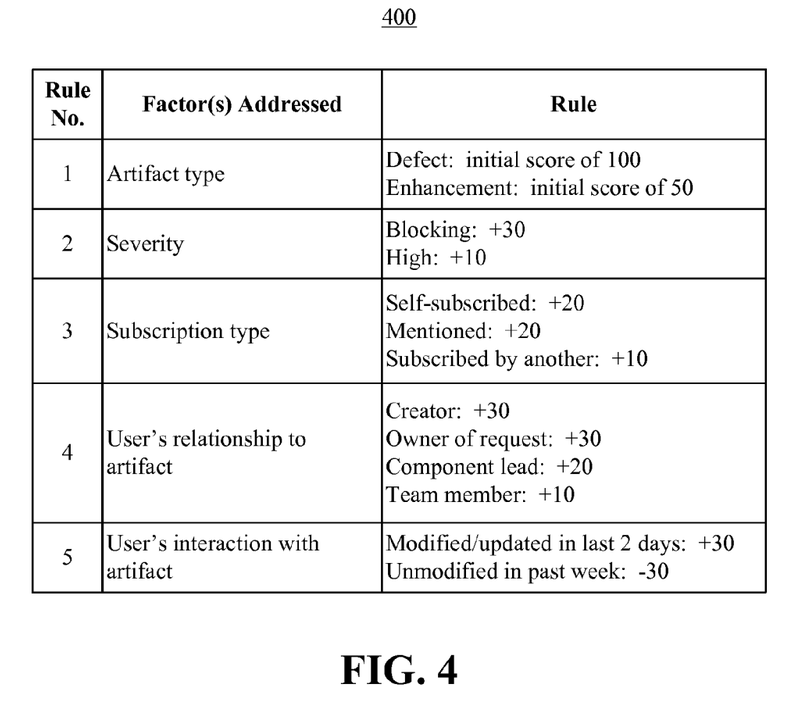
FIG. 4 is a table illustrating exemplary rules used to calculate scores.

FIG. 4 is a table 400 illustrating exemplary rules used to calculate scores. The rules may be used by the collaborative system, e.g., the change request system. Consider the case in which the collaborative system is a change request system for a software-based system. During system verification testing, a tester discovers a first issue and a second issue. Each issue becomes a request for change (RFC), which is a managed artifact within the change request system. The first issue is created with a type of "defect" having a severity of "blocking" within the change request system. The first issue is referred to herein as "defect 1." The second issue is created with a type of "enhancement" with a severity of "high" within the change request system. The second issue is referred to herein as the "enhancement 1." The tester subscribes a first user called "developer A" and a second user called "developer B" to defect 1 and to enhancement 1.

Operation of the change request system is described below with reference to the rules shown in FIG. 4. For purposes of illustration, it can be presumed that a score begins with an initial value of zero and is adjusted from that point through application of the rules illustrated in FIG. 4.

Rule 1 sets an initial score according to the type of the artifact for which the event is detected, i.e., the instant artifact. A defect type of artifact, for example, sets the score to 100. An enhancement type of artifact sets the score to 50. Rule 2 adjusts the score according to the severity of the artifact. A severity of "blocking" for an artifact increases the score by 30. A severity of "high" increases the score by 10.

Rule 3 adjusts the score according to which user subscribed the selected user to the instant artifact. When one self-subscribes to an artifact, the score is increased by 20. When the selected user is subscribed to an artifact by another user, the score is increased by 10. When the selected user is mentioned in the artifact, e.g., using a reference such as a username and/or handle detected within the text of the artifact, the score is increased by 20. For example, mention of a username or other identifier of a user within a comment posted to an artifact may result in adjustment of the score for the user mentioned in the comment presuming that the user is already subscribed to the artifact.

Rule 4 adjusts the score according to the relationship of the selected user to the instant artifact. When the selected user is the creator of the instant artifact, the score is increased by 30. When the selected user is the owner of the instant artifact, the score is increased by 30. When the selected user is the component lead for the instant artifact, the score is increased by 20. When the selected user is a team member for the instant artifact, the score is increased by 10.

Rule 5 adjusts the score according to interaction between the selected user and the instant artifact. For example, when the selected user modifies and/or updates the instant artifact in the last two days, the score being calculated is increased by 30. When the selected user does not modify and/or update the instant artifact any time during the last week, the score that is being calculated is decreased by 30.

Given the exemplary rules depicted in FIG. 4, the system may determine a score for developer A and a score for developer B for each of the artifacts noted. Further, a score for each artifact may be calculated for the tester. Calculation of the scores described below is provided for purposes of illustration only and not limitation. Further it should be appreciated that score calculation is performed responsive to detection of a change to each respective artifact.

Applying rule 1 to defect 1, the score is initially calculated as 100 since the type is "defect." Applying rule 2 to defect 1, the score increased by 30 since the severity is "blocking." Thus, score of defect 1 calculated by application of rules 1 and 2 is 130 for each of developer A, developer B, and the tester.

Applying rule 1 to enhancement 1, the score is initially calculated as 50 since the type is "enhancement." Applying rule 2 to enhancement 1, the score is increased by 10 since the severity is "high." Thus, the score of enhancement 1 calculated after application of rules 1 and 2 is 60 for each of developer A, developer B, and the tester.

Developer A and developer B were subscribed to both defect 1 and enhancement 1 by the tester, e.g., by another user. As such, neither developer A nor developer B was self-subscribed. Applying rule 3, the score for defect 1 for each of developer A and developer B is increased by 10. Similarly, the score calculated for enhancement 1 for developer A and the score calculated for enhancement 1 for developer B is increased by 10. Because the tester self-subscribed, the score for the tester is increased by 20 for each of defect 1 and enhancement 1.

Applying rule 4, developer A is a team member and a component lead for both defect 1 and enhancement 1. As such, the score for developer A for both defect 1 and for enhancement 1 is increased by 20 in consequence of the component lead relationship of developer A to defect 1 and enhancement 1. The score for developer A for both defect 1 and for enhancement 1 is further increased by 10 in consequence of the team member relationship between developer A and each artifact. Developer B is a team member for both defect 1 and for enhancement 1. The score for developer B for both defect 1 and for enhancement 1 is increased by 10 in consequence of the team member relationship between developer B and each artifact. The tester is the creator of defect 1 and enhancement 1. Accordingly, the score for the tester for defect 1 is increased by 30 as is the score for enhancement 1 in consequence of the creator relationship of the tester to each artifact. Rule 5 is not applied in this example.

Applying rule 5, developer A has modified and/or updated defect 1 in the last two days. Accordingly, the score for developer A for defect 1 is increased by 30. Developer B has not made any changes to defect 1 in over a week. As such, the score for developer B for defect 1 is decreased by 30. The tester modified defect 1 four days ago. Accordingly, rule 5 has no effect upon the score for the tester for defect 1. Referring to enhancement 1, developer A has not modified enhancement 1 in over a week. As such, the score for developer A for enhancement 1 is decreased by 30. Both developer B and the tester modified enhancement 1 three days ago. Accordingly, rule 5 has no effect upon the score for enhancement 1 for either developer B or the tester.

Applying the rules as discussed above, the score for developer A for defect 1 is calculated as 100+30+10+(20+10)+30=200. The score for developer B for defect 1 is calculated as 100+30+10+10−30=120. The score for the tester for defect 1 is calculated as 100+30+20+30+0=180. As discussed, each score indicates the level of interest the user has in an artifact and/or a change to the artifact detected in the form of one or more events.

Continuing, the score for developer A for enhancement 1 is calculated as 50+10+10+(20+10)−30=70. The score for developer B for enhancement 1 is calculated as 50+10+10+10+0=80. The score for the tester for enhancement 1 is calculated as 50+10+20+30+0=110.

Figure 5:
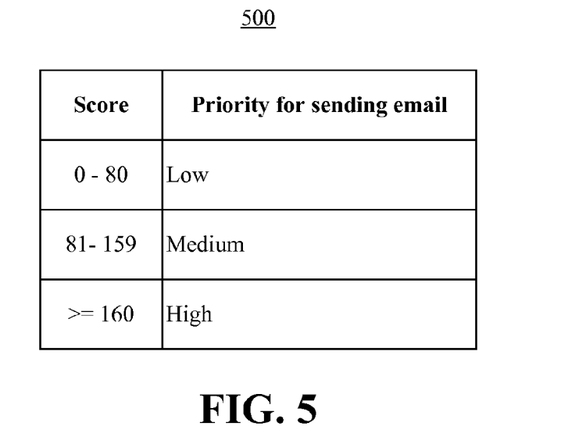
FIG. 5 is a table illustrating exemplary rules for interpreting scores for sending notifications.

FIG. 5 is a table 500 illustrating exemplary rules for interpreting scores for sending notifications. For purposes of illustration, it is assumed that electronic mail is used as the default communication channel over which change notifications are sent to users. Further, electronic mail may be sent having an importance of "high," "medium," or "low" which is set for the change notification based upon score. Responsive to determining that the score is between 0 and 80, the electronic mail message sent as the change notification is sent with a priority of "low." Responsive to determining the score is between 81 and 159, the electronic mail message sent as the change notification is sent with a priority of "medium." Responsive to determining that the score is greater than or equal to 160, the electronic mail message sent as the change notification is sent with the priority of "high." Appreciably, for other communication channels that do not support priorities, e.g., text messaging, the priority of the notification can be included or specified within the message text, e.g., a first line of the message text, a subject line of the notification if one is available, or the like.

Figure 61:
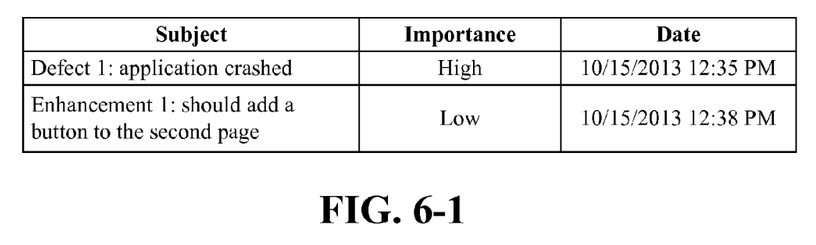
Figure 62:
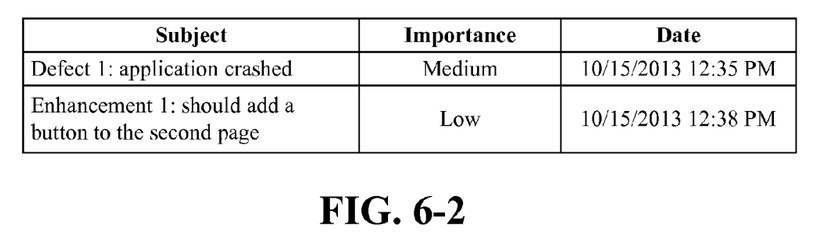
Figure 63:
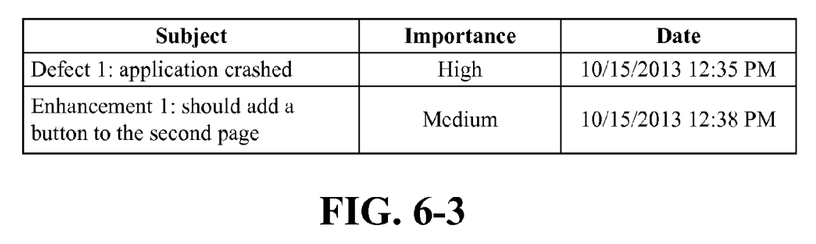

FIGS. 6-1, 6-2, and 6-3 illustrate exemplary user interfaces displayed by client systems of different users. FIG. 6-1 illustrates a view displayed by an electronic mail application executing on the client used by developer A. As shown, the change notification sent for defect 1 appears with a high importance, while the change notification sent for enhancement 1 appears with a low importance.

FIG. 6-2 illustrates a view displayed by an electronic mail application executing on the client used by developer B. As shown, the change notification sent for defect 1 appears with a medium importance, while the change notification sent for enhancement 1 appears with a low importance.

FIG. 6-3 illustrates a view displayed by an electronic mail application executing on the client used by the tester. As shown, the change notification sent for defect 1 appears with a high importance, while the change notification sent for enhancement 1 appears with a medium importance.

As illustrated, the score that is calculated can be used to rank change notifications. While FIG. 6 pictures electronic mail clients, the score itself or a representation of the score, e.g., an importance of low, medium, or high, may be displayed in a subject line of the change notification, in an event viewer, in a feed reader, or the like. Further, as discussed, the score may be used to determine the communication channel over which the change notification is sent and/or type of change notification that is sent. For example, responsive to a high score being calculated, a change notification is sent as an individual, high importance electronic mail message. Responsive to a medium score being calculated, a change notification is sent as an individual, medium importance electronic mail message. Multiple change notifications may be sent in a single electronic mail message, e.g., a digest, responsive to multiple scores for different events and/or artifacts being calculated in a range denoted as moderate. Responsive to a low score, no change notification need be sent.

As pictured in FIG. 6, scores are useful to the recipient of the change notification in determining which of the change notifications should be read, prioritizing, and/or ranking such change notifications. For example, the score can be included in or as part of the electronic mail message sent as the change notification allowing the user, or recipient, to sort change notifications according to the score. The score, being an attribute of a received message, further may be used within the client to apply additional client-side rules such as highlighting, automatically creating a to-do item from the received electronic mail message for inclusion in a to-do list, or the like.

As previously discussed, while software development was used for purposes of illustration, the scoring of artifacts and/or events for artifacts may be applied to other collaborative applications. In the context of micro-blogging, for example, one may subscribe to a feed, i.e., an artifact, and use scoring as a way of filtering change notifications sent to the subscribing user so that only change notifications advising of posts and/or other activity on the feed of interest to the subscribing user are sent. The subscribing user may only desire change notifications relating to particular subjects, tags, classifications, etc.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    detecting an event for an artifact managed by a collaborative system;
    determining a user subscribed to the artifact;
    responsive to the event, calculating a score for the event using a processor, wherein the score is user-specific and indicates a level of interest of the user for the event, and wherein calculating comprises:
        adjusting the score respectively in response to determining whether the user self-subscribed to the artifact or was subscribed to the artifact by a different user, wherein when the user is subscribed by a different user, a size of the adjustment to the score is based on one or more of a role, position, and relationship of the different user with respect to one or more of the user, the artifact, and the detected event;
    comparing the score with a threshold score; and
    sending a change notification of the event to the user responsive to determining that the score exceeds the threshold score.

2. The method of claim 1, further comprising:
    selecting a communication channel over which the change notification is sent according to the score.

3. The method of claim 1, further comprising:
    setting a level of importance of a message sent as the change notification according to the score.

4. The method of claim 1, wherein the calculating comprises:
    adjusting the score according to a priority level of the artifact.

5. The method of claim 1, wherein the calculating comprises:
    adjusting the score according to a level of interest of the user in a different artifact to which the user is subscribed that has a classification similar to the artifact.

6. The method of claim 1, wherein the calculating comprises:
    adjusting the score according to a relationship between the user and the artifact.

7. The method of claim 6, wherein
    the relationship is that the user created the artifact.

8. The method of claim 6, wherein
    the relationship is that the user is a member of a team that develops the artifact.

9. The method of claim 1, wherein the calculating comprises:
    adjusting the score according to a classification of the artifact.

10. The method of claim 1, wherein the calculating comprises:
    adjusting the score according to the user previously modifying the artifact within a predetermined time period of the event.

11. The method of claim 1, wherein the calculating comprises:
    adjusting the score according to the user being referenced by the artifact.

* * * * *